United States Patent
Ramprashad et al.

(10) Patent No.: US 12,228,080 B1
(45) Date of Patent: Feb. 18, 2025

(54) ENGINE FUEL NOZZLE DEGRADATION TRACKING

(71) Applicant: Hamilton Sundstrand Corporation, Charlotte, NC (US)

(72) Inventors: Sachin Ramprashad, West Hartford, CT (US); Eric Briggs, Indian Trail, NC (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/378,990

(22) Filed: Oct. 11, 2023

(51) Int. Cl.
    *F02C 7/228* (2006.01)
    *F02C 7/232* (2006.01)
    *F02C 7/26* (2006.01)

(52) U.S. Cl.
    CPC ............... *F02C 7/26* (2013.01); *F02C 7/228* (2013.01); *F02C 7/232* (2013.01); *F05D 2260/85* (2013.01); *F23R 2900/00004* (2013.01)

(58) Field of Classification Search
    CPC .. F02C 7/228; F23R 3/34; F23R 3/346; F23R 2900/00004
    See application file for complete search history.

(56) References Cited

U.S. PATENT DOCUMENTS

| | | | |
|---|---|---|---|
| 6,408,611 B1 * | 6/2002 | Keller | F02C 9/28 60/773 |
| 7,530,260 B2 | 5/2009 | Dooley | |
| 7,841,184 B2 | 11/2010 | Dooley | |
| 8,499,542 B2 | 8/2013 | Zebrowski | |
| 10,087,852 B2 | 10/2018 | Eifert et al. | |
| 10,815,893 B2 | 10/2020 | Kleckler et al. | |
| 10,982,858 B2 | 4/2021 | Bickley | |
| 2021/0301724 A1 * | 9/2021 | Reuter | F02C 7/228 |

* cited by examiner

*Primary Examiner* — Scott J Walthour
(74) *Attorney, Agent, or Firm* — Kinney & Lange, P.A.

(57) ABSTRACT

A system includes a burn flow line and a flow divider valve in fluid communication with the burn flow line to split flow from the burn flow line to a primary line and to a secondary line for supplying fuel to a set of primary engine nozzles and to a set of secondary engine nozzles, respectively. A sensor operatively connected to the flow divider valve to produce a feedback signal indicative of flow split between the primary line and the secondary line. A controller is operatively connected to receive the feedback signal from the senor, compare the feedback signal to a stored flow split value for a mismatch, and output an alert message upon detecting the mismatch.

19 Claims, 1 Drawing Sheet

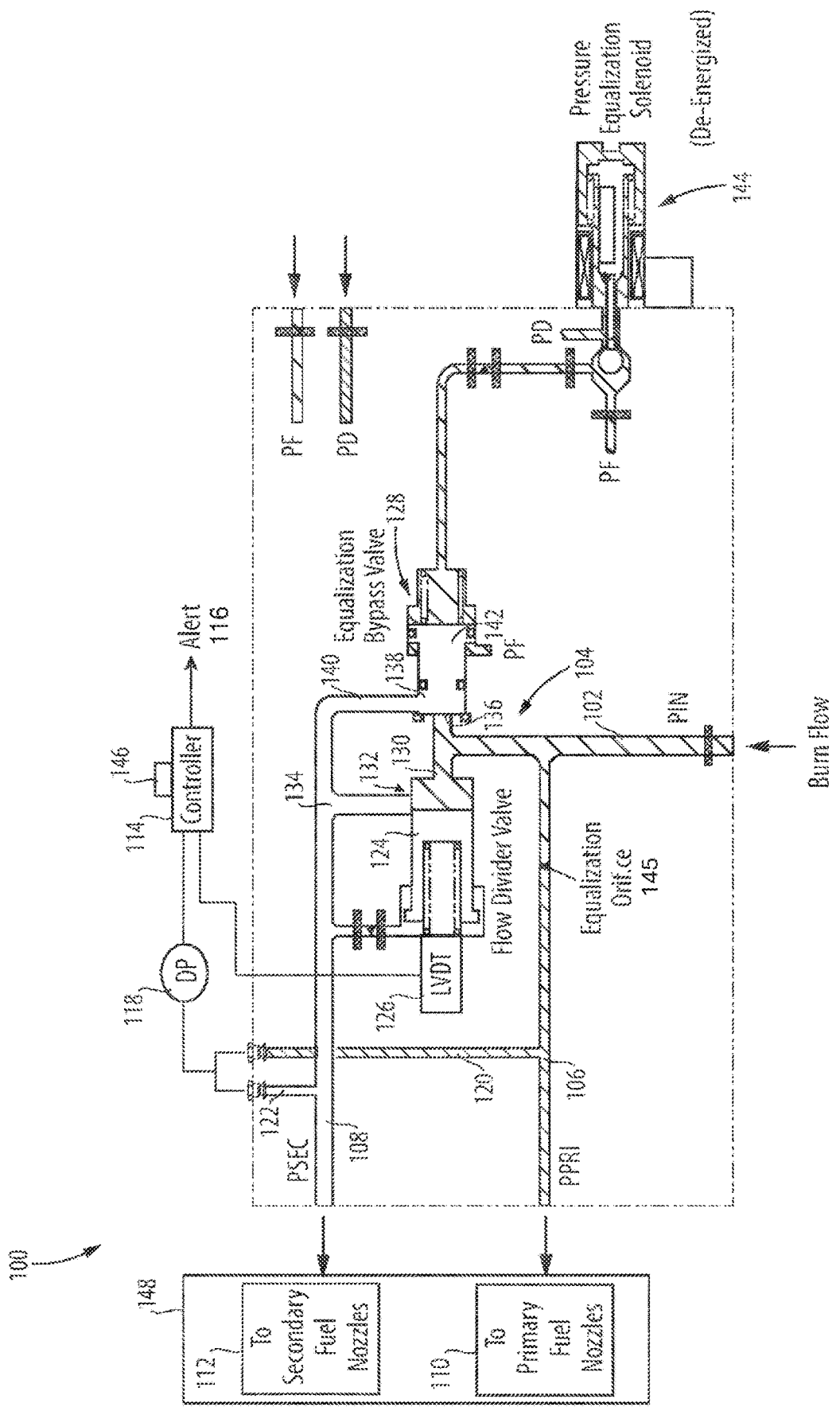

ENGINE FUEL NOZZLE DEGRADATION TRACKING

BACKGROUND

1. Field

The present disclosure relates to gas turbine engines, and more particularly to health monitoring fuel nozzles in gas turbine engines.

2. Description of Related Art

In hot environments, fuel will coke (or "lacquer") in nozzles and related plumbing, causing a change to the effective area of the nozzles. Over time, the buildup of coke or lacquer in a fuel nozzle and its plumbing will change the flow split among the nozzles in an engine. Uneven flow splits can eventually cause hot spots in the engine combustor, reducing turbine life.

The conventional techniques have been considered satisfactory for their intended purpose. However, there is an ever present need for improved systems and methods for health monitoring for engine fuel nozzles in gas turbine engines. This disclosure provides a solution for this need.

SUMMARY

A system includes a burn flow line and a flow divider valve in fluid communication with the burn flow line to split flow from the burn flow line to a primary line and to a secondary line for supplying fuel to a set of primary engine nozzles and to a set of secondary engine nozzles, respectively. A sensor operatively connected to the flow divider valve to produce a feedback signal indicative of flow split between the primary line and the secondary line. A controller is operatively connected to receive the feedback signal from the senor, compare the feedback signal to a stored flow split value for a mismatch, and output an alert message upon detecting the mismatch.

The sensor can include a pressure sensor operatively connected to detect pressure differentials between: a first pressure port line in fluid communication with a point in the primary line downstream from the flow divider valve, and a second pressure port line in fluid communication with a point in the secondary line downstream from the flow divider valve. The pressure sensor can include a differential pressure transducer in fluid communication with each of the first pressure port line and the second pressure port line.

The flow divider valve can include a sliding piston member configured to split flow between the primary line and the secondary line based on position of the sliding piston member within the flow divider valve. A position sensor can be operatively connected to the sliding piston to produce the feedback signal based on position of the sliding piston member within the flow divider valve. The position sensor can include a linear variable differential transformer (LVDT).

An equalization bypass valve can be in fluid communication with the burn flow line, operatively connected to control position of the sliding piston member. The flow divider valve can have an FBV inlet in fluid communication with the burn flow line, and an outlet connected in fluid communication with a first feeder line of the secondary line. The equalization bypass valve can have an EBV inlet in fluid communication with the burn flow line, and an outlet connected in fluid communication with a second feeder line of the secondary line. The flow divider valve and the equalization bypass valve can be in parallel with one another. The equalization bypass valve can include an EBV piston operatively connected to control the flow divider valve by changing position of the EBV piston. A pressure equalization solenoid can be operatively connected to control hydraulic pressure acting on the EBV piston to control the flow divider valve.

An equalization orifice in the primary line can be connected in fluid communication to throttle flow from the burn flow line into the primary line. The controller can be operatively connected to the pressure equalization solenoid to control the flow divider valve. The controller can be configured to control the flow divider valve to bias flow to the primary line for an initial portion of an engine startup sequence, and to bias more flow to the secondary line after the initial portion of the engine startup sequence. The controller can include a memory and is configured to read a previous feedback signal from the memory wherein the previous feedback signal relates to a prior engine startup sequence. The controller can be configured to store into the memory a current feedback signal obtained during a current engine startup sequence for use in comparison with a future feedback single to be obtained in a future engine startup sequence. The controller can be configured to monitor the feedback signal each time an engine is operated and to detect a trend in the feedback signal indicative of a change in fuel nozzle performance over time.

A method includes starting up a gas turbine engine and monitoring a feedback signal indicative of a fuel split between a primary line feeding a set of primary engine nozzles and a secondary line feeding a set of secondary engine nozzles. The method includes outputting an alert for taking action in response to the feedback signal being mismatched with an expected flow split and shutting down the gas turbine engine.

The expected flow split can be from a previous feedback signal from a previous startup sequence of the gas turbine engine. The method can include storing the feedback signal for use in a future operation of the gas turbine engine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view of an embodiment of a system constructed in accordance with the present disclosure, showing two locations for measurements that can be used to monitor for degradation in engine fuel nozzles and the accompanying fluid pathways.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to monitor for degradation in engine fuel nozzles and the accompanying fluid pathways.

In some engine applications, a flow divider valve (FDV) is used to distribute flow between primary and secondary nozzles, and bias flow more heavily towards the primary (lower flowing) nozzles during an engine start. By tracking either (1) the delta pressure between the primary and secondary lines, regulated by the FDV, or (2) the position of the FDV at a similar condition each flight, it can be determined if a change in plumbing or nozzle effective flow areas has occurred. This can be done via BIT (built in test) check each flight at a similar ground start/idle conditions, and if pressures or valve position exceeds a limit, a fault can be issued.

The system 100 includes a burn flow line 102 and an FDV 104 in fluid communication with the burn flow line 102 to split flow from the burn flow line 102 to a primary line 106 and to a secondary line 108 for supplying fuel to a set of primary engine nozzles 110 and to a set of secondary engine nozzles 112, respectively. A sensor is operatively connected to the FDV to produce a feedback signal indicative of flow split between the primary line 106 and the secondary line 108. A controller 114 is operatively connected to receive the feedback signal from the senor, compare the feedback signal to a stored flow split value for a mismatch, and output an alert message 116 upon detecting the mismatch.

The sensor can include a pressure sensor 118 operatively connected to detect pressure differentials between: a first pressure port line 120, and a second pressure port line 122 in fluid communication with a point in the secondary line downstream from the FDV. The first pressure port line 120 is in fluid communication with a point in the primary line 106 downstream from the FDV 104 (i.e. downstream of where the primary line 106 branches off of the burn line 102 upstream of the FDV 104). The second pressure port line 122 is in fluid communication with a point in the secondary line 108 downstream from the FDV 104. The pressure sensor 118 can include a differential pressure transducer in fluid communication with each of the first pressure port line 120 and the second pressure port line 122. Based on the pressure difference at the pressure sensor 118 required to achieve the desired flow split from flight to flight, the controller 114 can detect changes in this pressure differential to detect coke build up and issue the alert 116 as needed.

The FDV 104 includes a sliding piston member 124 configured to split flow between the primary line 106 and the secondary line 108 based on position of the sliding piston member 124 within the FDV 104. The sensor in the system 100 (in addition to or in lieu of the pressure sensor 118) can be a position sensor 126 operatively connected to the sliding piston 124 to produce the feedback signal based on position of the sliding piston member 124 within the FDV 104. The position sensor 126 can include a linear variable differential transformer (LVDT). Based on the position of the sliding piston member 124 required to achieve the desired flow split from flight to flight, the controller 114 can detect changes in this position to detect coke build up and issue the alert 116 as needed.

An equalization bypass valve (EBV) 128 is in fluid communication with the burn flow line 102, operatively connected to control position of the sliding piston member 124 of the FDV 104. The FDV 104 has an FBV inlet 130 in fluid communication with the burn flow line 102, and an outlet 132 connected in fluid communication with a first feeder line 134 of the secondary line 108. The EBV 128 has an EBV inlet 136 in fluid communication with the burn flow line 102, and an outlet 138 connected in fluid communication with a second feeder line 140 of the secondary line 108. The FDV 104 and the EBV 128 are in parallel with one another. The EBV 128 includes an EBV piston 142 operatively connected to control the FDV 104 by changing position of the EBV piston 142, i.e. the EBV 128 moves the FDV 104 since one or the other must open to its respective feeder line 134, 140 because flow must go to the secondary fuel nozzle line 108. A pressure equalization solenoid 144 is operatively connected to control hydraulic pressure acting on the EBV piston 142 to control the FDV 104, e.g. using input pressures PF and PD. In FIG. 1 the solenoid 144 is shown deenergized and the EBV 128 is closed.

An equalization orifice 145 in the primary line 106 is connected in fluid communication to throttle flow from the burn flow line 102 into the primary line 106. The controller 114 is operatively connected to the pressure equalization solenoid 144 to control the FDV 104. The controller 114 is configured to control the FDV 104 to bias flow to the primary line 106 for an initial portion of an engine startup sequence, and to bias more flow to the secondary line 108 after the initial portion of the engine startup sequence. The controller 114 includes a memory 146 and is configured to read a previous feedback signal from the memory 146 wherein the previous feedback signal relates to a prior engine startup sequence, i.e. to a prior flight. The controller 114 is configured to store into the memory a current feedback signal obtained during a current engine startup sequence for use in comparison with a future feedback single to be obtained in a future engine startup sequence, i.e. for use in future flights. The controller 114 is configured to monitor the feedback signal from the sensor 118 and/or 126 each time an engine is operated and to detect a trend in the feedback signal indicative of a change in fuel nozzle performance over time.

A method includes starting up a gas turbine engine 148 and monitoring a feedback signal indicative of a fuel split between a primary line 106 feeding a set of primary engine nozzles 110 and a secondary line 108 feeding a set of secondary engine nozzles 112. The method includes outputting an alert 116 for taking action in response to the feedback signal being mismatched with an expected flow split and shutting down the gas turbine engine 148, and servicing the engine 148 to correct the flow split if there was an alert 116. The expected flow split for the controller can be derived from a previous feedback signal from a previous startup sequence or flight of the gas turbine engine. The method can include storing the feedback signal from a current flight for use in a future operation of the gas turbine engine.

Systems and methods as disclosed herein provide potential benefits including the following. Coking of fuel nozzles changes the restriction in the fuel system and can also change the distribution of burn flow going into the engine combustor. Systems and method as disclosed herein allow for some monitoring of these degraded components which can indicate the need for engine servicing.

The methods and systems of the present disclosure, as described above and shown in the drawings, provide for monitoring for degradation in engine fuel nozzles and the accompanying fluid pathways. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of operating a gas turbine engine, the gas turbine engine comprising a system, the system comprising:
   a burn flow line;
   a flow divider valve in fluid communication with the burn flow line to split flow from the burn flow line to a primary line and to a secondary line for supplying fuel to a set of primary engine nozzles and to a set of secondary engine nozzles, respectively;
   a sensor operatively connected to the flow divider valve to produce a feedback signal indicative of a flow split between the primary line and the secondary line; and
   a controller having a memory, the controller configured and operatively connected to:
      receive the feedback signal from the sensor;
      compare the feedback signal to a stored flow split value to detect a mismatch between the flow split and the stored flow split value;
      output an alert message upon detecting the mismatch;
      monitor the feedback signal each time the engine is operated; and
   detect a trend in the monitored feedback signal indicative of a change in fuel nozzle performance over time,
      the method comprising:
      starting up the gas turbine engine;
      monitoring the feedback signal;
      outputting the alert for taking action in response to the mismatch; and
      shutting down the gas turbine engine.

2. The method as recited in claim 1, wherein the stored flow split is from a previous feedback signal from a previous startup sequence of the gas turbine engine.

3. The method as recited in claim 1, further comprising storing the feedback signal for use in a future operation of the gas turbine engine.

4. A system for an engine, the system comprising:
   a burn flow line;
   a flow divider valve in fluid communication with the burn flow line to split flow from the burn flow line to a primary line and to a secondary line for supplying fuel to a set of primary engine nozzles and to a set of secondary engine nozzles, respectively;
   a sensor operatively connected to the flow divider valve to produce a feedback signal indicative of a flow split between the primary line and the secondary line; and
   a controller having a memory, the controller configured and operatively connected to:
      receive the feedback signal from the sensor;
      compare the feedback signal to a stored flow split value to detect a mismatch between the flow split and the stored flow split value;
      output an alert message upon detecting the mismatch;
      monitor the feedback signal each time the engine is operated; and
      detect a trend in the monitored feedback signal indicative of a change in fuel nozzle performance over time.

5. The system as recited in claim 4, wherein the sensor includes a pressure sensor operatively connected to detect pressure differentials between:
   a first pressure port line in fluid communication with a point in the primary line downstream from the flow divider valve; and
   a second pressure port line in fluid communication with a point in the secondary line downstream from the flow divider valve.

6. The system as recited in claim 5, wherein the pressure sensor includes a differential pressure transducer in fluid communication with each of the first pressure port line and the second pressure port line.

7. The system as recited in claim 4, wherein the flow divider valve includes a sliding piston member configured to split flow between the primary line and the secondary line based on a position of the sliding piston member within the flow divider valve.

8. The system as recited in claim 7, further comprising a position sensor operatively connected to the sliding piston to produce the feedback signal based on the position of the sliding piston member within the flow divider valve.

9. The system as recited in claim 8, wherein the position sensor includes a linear variable differential transformer (LVDT).

10. The system as recited in claim 7, further comprising an equalization bypass valve in fluid communication with the burn flow line, operatively connected to control the position of the sliding piston member.

11. The system as recited in claim 10, wherein the flow divider valve has an inlet in fluid communication with the burn flow line, and an outlet connected in fluid communication with a first feeder line of the secondary line.

12. The system as recited in claim 11, wherein the equalization bypass valve has an EBV inlet in fluid communication with the burn flow line, and an outlet connected in fluid communication with a second feeder line of the secondary line, wherein the flow divider valve and the equalization bypass valve are in parallel with one another.

13. The system as recited in claim 12, wherein the equalization bypass valve includes an EBV piston operatively connected to control the flow divider valve by changing a position of the EBV piston.

14. The system as recited in claim 13, further comprising a pressure equalization solenoid operatively connected to control hydraulic pressure acting on the EBV piston to control the flow divider valve.

15. The system as recited in claim 14, further comprising an equalization orifice in the primary line connected in fluid communication to throttle flow from the burn flow line into the primary line.

16. The system as recited in claim 14, wherein the controller is operatively connected to the pressure equalization solenoid to control the flow divider valve.

17. The system as recited in claim 14, wherein the controller is configured to control the flow divider valve to bias flow to the primary line for an initial portion of an engine startup sequence, and to bias more flow to the secondary line after the initial portion of the engine startup sequence.

18. The system as recited in claim 17, wherein the controller and is configured to read a previous feedback signal from the memory wherein the previous feedback signal relates to a prior engine startup sequence.

19. The system as recited in claim 18, wherein the controller is configured to store into the memory a current feedback signal obtained during a current engine startup sequence for use in comparison with a future feedback single to be obtained in a future engine startup sequence.

* * * * *